Figure 1:
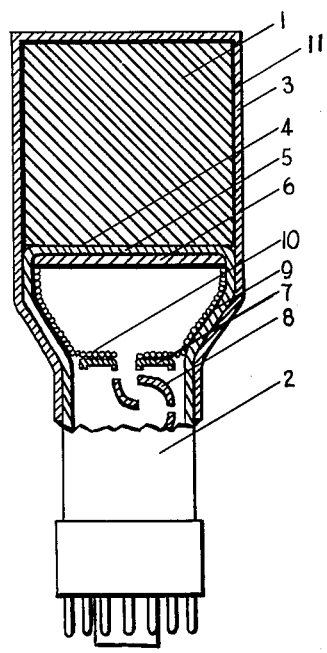
Figure 2:
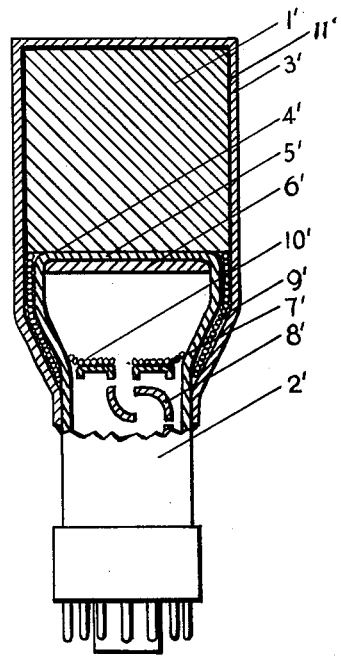

Sept. 11, 1962   R. W. CARLSON   3,053,982
SCINTILLATION METER COMPONENTS AND
PHOTOMULTIPLIER TUBES THEREFOR
Filed April 23, 1959

ROLAND W. CARLSON, *INVENTOR.*

BY
*William H Brown*

United States Patent Office 3,053,982
Patented Sept. 11, 1962

3,053,982
SCINTILLATION METER COMPONENTS AND
PHOTOMULTIPLIER TUBES THEREFOR
Roland W. Carlson, East Cleveland, Ohio, assignor to The
Harshaw Chemical Company, Cleveland, Ohio, a corporation of Ohio
Filed Apr. 23, 1959, Ser. No. 808,470
12 Claims. (Cl. 250—71.5)

The present invention relates to improved scintillation meter components and to improved photomultiplier tubes employed therein.

Photomultiplier tubes are electric devices for converting light energy into electrical energy. Basically a photomultiplier tube consists of a cylindrical glass envelope surrounding an electrode system called the dynodes. The top surface of the cylindrical glass envelope is the end window. On the inner surface of the end window is deposited a light sensing photo cathode. Light incident on the photo cathode causes it to emit photoelectrons, which are then focused and accelerated to the dynode system. The dynode system serves to amplify the electronic impulses to a degree sufficient for recording on a suitable registering device.

The light conversion mechanism which occurs within the photomultiplier tube, however, is subject to certain deficiencies. The photo cathode, being of a transparent nature, has the ability to transmit as well as convert light energy resulting in a certain amount of light energy being unrecorded. It would, therefore, be a major improvement in the photomultiplier tube if the transmitted light were reflected back to the photo cathode and thus converted into electrical energy. The reflective coating may be disposed entirely upon the interior of the photomultiplier tube itself or partially on the photomultiplier tube and partially on the mechanical coupling mechanism used in coupling the photomultiplier tube to other devices such as, for instance, a luminophore employed in a scintillation meter.

Scintillation meters are radiation detectors which function by means of converting radiation energy to light energy and thence to a measurable electric current. The improved photomultiplier tubes of this invention are suitably coupled to luminophores of the scintillation crystals type thereby producing improved scintillation meter components. The improved scintillation meter components of this invention employ novel diffuse reflective coatings deposited on the scintillation meter housing devices whereby the novel reflective coatings disposed on the photomultiplier tube are supplemented.

It is, therefore, an object of this invention to provide an improved photomultiplier tube by means of a diffuse reflective coating placed on certain interior portions of said photomultiplier tube.

It is another object of this invention to provide an improved scintillation meter component by means of diffuse reflective coatings disposed on the photomultiplier tube assembly and the scintillation crystal housing assembly.

Reflective coatings may be divided into two broad classes, namely diffuse reflective coatings and specular reflective coatings. The diffuse reflective coating will reflect a beam of light in all directions while a specular reflective coating will reflect a beam of light unidirectionally. Examples of diffuse reflective coatings are metal oxides such as magnesium oxide and aluminum oxide, while representative examples of specular reflective coatings are mirror finish metallic coatings such as mirror aluminum and silver coatings. For the purposes of this invention, light must be reflected in all directions and therefore a diffuse reflective coating must be employed. The diffuse reflective coatings of this invention may be disposed entirely within the photomultiplier tube or partially within the photomultiplier tube and partially without the photomultiplier tube. The preferred diffuse reflective coating materials are magnesium oxide and aluminum oxide, although other diffuse light reflective materials may be employed. It has been found that any of the well-known coating processes may be used to form this diffuse reflective coating. However, a vapor deposition coating, a spray coating, and a packed coating process have been found to be especially suitable for the purposes of this invention.

When a diffuse reflective coating is disposed entirely within the photomultiplier tube, the coating is positioned so as to cover the entire interior lateral surface of the phototube from a point behind the end window to a point up to and including the focus grid. It has been found desirable to frost the glass surfaces before depositing the diffuse reflective coating. The diffuse reflective coating is usually deposited by means of a spray coating or a vapor coating process.

In addition to the placement of the diffuse reflective coating entirely within the photomultiplier tube, a division of the coating material between the photomultiplier tube and the scintillation crystal coupling component has been found to be desirable in certain instances. When partial coating procedures are applied, the focus grid alone of the photomultiplier tube is given a diffuse reflective coating. The focus grid is preferably coated by a spray process or a vapor deposition process. In place of a diffuse reflective coating on the interior lateral surfaces of a phototube, a coating covering the adjacent area and disposed upon a scintillation crystal coupling component is employed. The area is preferably coated by means of a packing process. The scintillation crystal coupling component engages all lateral surfaces of the photomultiplier tube in which vicinity a diffuse light reflective coating is necessary.

The proposed scintillation meter components and the photomultiplier tubes employed therein are shown in FIGURES I and II. FIGURE I represents a scintillation meter component wherein the reflective system for the photomultiplier tube is carried within the photomultiplier tube alone. FIGURE II represents a scintillation meter component wherein the diffuse reflective system for the photomultiplier tube is partially carried within the photomultiplier tube while the scintillation crystal coupling component carries the remainder of the diffuse reflective coating. The scintillation meter components employing the novel diffuse reflective coating systems of this invention function according to the following theory:

*Theory*

The energy resolution of a scintillation detector is determined for the most part by the scintillation crystal and photomultiplier tube used. The observed resolution is the product of the intrinsic scintillator resolution and the photomultiplier tube resolution. The photomultiplier tube resolution has been shown to be determined by the number of photoelectrons produced at the photo cathode and by the secondary emission in the dynode system. However, the largest contributor in the phototube system is the number of photoelectrons. The diffuse light reflector system of the present invention serves to increase the energy resolving power of the scintillation crystal and the photomultiplier tube. Consider the system of scintillation crystal and photomultiplier tube as a white box having a white diffuse light reflector coating with the photo cathode separating the volume into two parts.

Let:

$L_c$ = Light collection factor for the crystal
$L_p$ = Light collection factor for the phototube
$E_0$ = Initial light intensity incident on the photo cathode
$\theta$ = Photo cathode efficiency
$T$ = Transmission of the photo cathode
$I_1$ = Partial photo cathode current
$\Sigma$ = Total photo cathode current For the light first incident on the photo cathode:

$$I_0 = \theta E_0$$

For that light transmitted by the photo cathode and then reflected back to the photo cathode:

$$I_1 = L_p T \theta E_0$$

For that reflected light that is transmitted by the photo cathode and is then re-reflected back to the photo cathode:

$$I_2 = L_c L_p T^2 \theta E_0$$

Similarly:

$$I_3 = L_c L_p^2 T^3 \theta E_0$$
$$I_4 = L_c^2 L_p^2 T^4 \theta E_0$$
$$I_5 = L_c^2 L_p^3 T^5 \theta E_0$$

Thus the total photo cathode current is:

$$I_\Sigma = I_0 + I_1 + I_2 + \ldots I_n + \ldots = \sum_{i=0}^{\infty} I_i$$

$$= \theta E_0 [1 + L_p T + L_c L_p T^2 + L_c L_p^2 T^3 + L_c^2 L_p^2 T^4 + \ldots]$$

$$= \theta E_0 \sum_{i=0}^{\infty} [(T^2 L_p L_c)^i + T L_p (T L_p L_c)^i]$$

$$= \theta E \sum_{i=0}^{\infty} (1 + T L_p)(T^2 L_p L_c)^i$$

$$= \theta E_0 \left[ \frac{1 + T L_p}{1 - T^2 L_p L_c} \right]$$

For present systems:

$$L_p \approx 0$$
$$\therefore I\Sigma \approx \theta E_0$$

For the white box system, we might expect:

$$T = 0.5; \quad L_p = L_c = 0.9$$

$$\therefore I_\Sigma = \theta E_0 \left[ \frac{1 + (.5)(.9)}{1 - (.5)^2(-9)(.9)} \right] = 1.82 \theta E_0$$

For the present system giving an energy resolution of 8%, we could expect a resolution (using the white box) of:

$$R_{wb} = \frac{1}{\sqrt{1.82}} \cdot 8\% = 5.92\%$$

If:

$$T = 0.75 \text{ and } L_p = L_c = 0.9;$$

$$I_\Sigma = \left[ \frac{1 + (.75)(.9)}{1 - (.75)^2(.9)(.9)} \right] \theta E_0 = 3.02 \theta E_0 \text{ and } R_{wb}$$

$$= \frac{1}{\sqrt{3.02}} 8\% = 4.60\%$$

The various incidental advantages which are the result of the novel reflective coating systems employed in the scintillation meter components and the photomultiplier tubes used therein will be apparent from the detailed description of the drawings which follows:

FIGURE I, which is not to scale, represents a side view of a scintillation meter component having a cut-away portion and employing one type of diffuse reflective coating. FIGURE II, which is not to scale, represents a side view of a scintillation meter component having a cutaway portion and employing another type of diffuse reflective coating.

In FIGURE I a scintillation crystal 1 is joined to a photomultiplier tube 2 at the end window 5 of the said photomultiplier tube; said juncture being effected by means of an optical coupling 4. The scintillation crystal 1 and the forward portion of the photomultiplier tube 2 are surrounded by a scintillation crystal coupling component 3. The area between the scintillation crystal 1 and the crystal coupling component 3 is packed with a diffuse reflective coating 11. The reflective coating 11 may be any of the materials suitable for the diffuse light reflective coating of the photomultiplier tube such as, for instance, aluminum oxide and magnesium oxide. The photomultiplier tube 2 has a semi-transparent photo cathode 6 disposed on the inner face of the end window 5. Behind said photo cathode is a focus grid 7 and behind said focus grid are disposed dynodes 8 of the photomultiplier dynode system. A suitable diffuse reflective coating 9 is disposed on the inner lateral walls of the photomultiplier tube from a point immediately behind the photo cathode to a point adjacent the focus grid 7. The focus grid 7 is also coated with a suitable diffuse reflective coating 10.

In FIGURE II a scintillation crystal 1' is joined to a photomultiplier tube 2' at the end window 5' of the said photomultiplier tube; said juncture being effected by means of an optical coupling 4'. The scintillation crystal 1' and the forward portion of the photomultiplier tube 2' are surrounded by a scintillation crystal coupling component 3'. The area between the scintillation crystal 1' and the crystal coupling component is packed with a diffuse reflective coating 11'. The reflective coating 11' may be any of the materials suitable for diffuse light reflective coating of the photomultiplier tube such as, for instance, aluminum oxide and magnesium oxide. The photomultiplier tube 2' has a semi-transparent photo cathode 6' disposed on the inner face of the end window 5'. Behind said photo cathode is a focus grid 7' and behind said focus grid are disposed dynodes 8' of the photomultiplier dynode system. A suitable diffuse reflective coating 9' is deposited on the inner surface of the scintillation crystal coupling component from a point adjacent the end window of the photomultiplier tube to a point adjacent the focus grid of the photomultiplier tube 2'. The focus grid 7' also has a suitable reflective coating 10' disposed therein.

In the operation of the scintillation meter component of FIGURE I radiation from a source of radiant energy passes through the scintillation crystal coupling component 3 and the diffuse reflective coating 11 to the scintillation crystal 1, where said radiant energy is converted into light energy. The light energy then passes through the optical coupling 4 and through the end window 5 to the semi-transparent photo cathode 6. At this point the light is either converted to electrical energy or is transmitted as unconverted light energy. The unconverted light will pass through the forward portions of the photomultiplier tube until it comes in contact with the coating 9 disposed on the lateral walls of the photomultiplier tube or the coating 10 disposed on the focus grid of the photomultiplier tube. Upon coming in contact with the diffuse reflective coatings, the light will be returned over either a direct or devious path to the photo cathode, where part of the light will be converted into electrical energy and part will again be transmitted. However, the light which is transmitted will enter the diffuse reflector system of the scintillation crystal where it will then be redirected toward the photo cathode. The process is continued until the light energy is either converted at the photo cathode or is lost from the system by imperfect reflections.

In operation the scintillation meter component of FIGURE II functions much the same as scintillation meter component of FIGURE I. The major distinction between FIGURE I and FIGURE II is that unconverted light being transmitted through the photo cathode will either be reflected from the coating 10' disposed on the focus grid or will pass through the lateral walls of the photomultiplier tube and be reflected by the reflective coating 9' disposed on the scintillation crystal coupling component. In FIGURE II, as in FIGURE I, a maximum amount of the radiation energy presented to the scintillation crystal is converted to electrical energy and delivered to the dynode system.

Having thus described the invention, what is claimed is:

1. In a photomultiplier tube having an end window with a semi-transparent photo cathode disposed on the inner surface thereof, a focus grid arranged to the rear of said end window and lateral walls which converge from said end window toward said focus grid, a diffuse light reflective coating disposed on said focus grid and on said lateral walls from a point adjacent said end window to a point adjacent said focus grid.

2. The photomultiplier tube of claim 1 wherein the diffuse light reflective coating is a metal oxide selected from the group consisting of aluminum oxide and magnesium oxide.

3. In a photomultiplier tube having an end window with a semi-transparent photo cathode disposed on the inner surface thereof, a focus grid arranged to the rear of said end window and lateral walls which converge from said end window toward said focus grid, a diffuse light reflective coating disposed on said focus grid.

4. The photomultiplier tube of claim 3 wherein the diffuse light reflective coating is a metal oxide selected from the group consisting of aluminum oxide and magnesium oxide.

5. A scintillation meter component comprising a scintillation crystal, a photomultiplier tube optically coupled thereto, a crystal housing component mechanically coupled to said scintillation crystal and said photomultiplier tube, a light diffuse reflective coating disposed between said crystal housing component and said scintillation crystal, said photomultiplier tube having an end window with a semi-transparent photo cathode disposed on the inner surface thereof, a focus grid having a diffuse light reflective coating disposed thereon arranged to the rear of said end window and lateral walls having a diffuse light reflective internal coating thereon, said lateral walls converging from said end window toward said focus grid.

6. The scintillation meter component of claim 5 wherein the diffuse reflective coatings are metal oxide coatings selected from the group consisting of aluminum oxide and magnesium oxide.

7. A scintillation meter component comprising a scintillation crystal, a photomultiplier tube optically coupled thereto, a crystal housing component mechanically coupled to said scintillation crystal and to the lateral walls of said photomultiplier tube, a diffuse light reflective coating disposed between said crystal housing component and said scintillation crystal and between said crystal housing component and said walls of said photomultiplier tube, said photomultiplier tube having an end window with a semi-transparent photo cathode disposed on the inner surface thereof, a focus grid having a diffuse light reflective coating disposed thereon arranged to the rear of said end window, the lateral walls of said photomultiplier tube converging from said end window toward said focus grid.

8. The scintillation meter component of claim 7 wherein the diffuse light reflective coatings are metal oxide coatings selected from the group consisting of aluminum oxide and magnesium oxide.

9. In a photomultiplier tube having an end window with a semi-transparent photo cathode disposed on the inner surface thereof, a focus grid arranged to the rear of said end window and lateral walls extending from said end window toward said focus grid, a diffuse light reflective coating disposed on said focus grid and on said lateral walls from a point adjacent said end window to a point adjacent said focus grid.

10. In a photomultiplier tube having an end window with a semi-transparent photo cathode disposed on the inner surface thereof, a focus grid arranged to the rear of said end window and lateral walls extending from said end window toward said focus grid, a diffuse light reflective coating disposed on said focus grid.

11. A scintillation meter component comprising a scintillation crystal, a photomultiplier tube optically coupled thereto, a crystal housing component mechanically coupled to said scintillation crystal and said photomultiplier tube, a diffuse light reflective coating disposed between said crystal housing component and said scintillation crystal, said photomutiplier tube having an end window with a semi-transparent photo cathode disposed on the inner surface thereof, a focus grid having a diffuse light reflective coating disposed thereon arranged to the rear of said end window and lateral walls having a diffuse light reflective internal coating thereon.

12. A scintillation meter component comprising a scintillation crystal, a photomultiplier tube optically coupled thereto, a crystal housing component mechanically coupled to said scintillation crystal and to the lateral walls of said photomultiplier tube, a diffuse light reflective coating disposed between said crystal housing component and said scintillation crystal and between said crystal housing component and said walls of said photomultiplier tube, said photomultiplier tube having an end window with a semi-transparent photo cathode disposed on the inner surface thereof, and a focus grid having a diffuse light reflective coating disposed thereon arranged to the rear of said end window.

References Cited in the file of this patent

UNITED STATES PATENTS

| | | |
|---|---|---|
| 2,203,048 | Farnsworth et al. | June 4, 1940 |
| 2,549,574 | Condiff | Apr. 17, 1951 |
| 2,559,219 | Ludeman | July 3, 1951 |
| 2,648,779 | Kohl | Aug. 11, 1954 |
| 2,758,217 | Scherbatskoy | Aug. 7, 1956 |
| 2,799,780 | Ruderman | July 16, 1957 |
| 2,841,715 | Schultz | July 1, 1958 |
| 2,853,620 | Fox et al. | Sept. 23, 1958 |
| 2,897,368 | Lundberg et al. | July 28, 1959 |
| 2,898,499 | Sternglass et al. | Aug. 4, 1959 |
| 2,916,625 | Penberthy | Dec. 8, 1959 |